United States Patent [19]

Storey et al.

[11] Patent Number: 5,419,578
[45] Date of Patent: May 30, 1995

[54] INERTIA WELDED INFLATOR

[75] Inventors: Kirk Storey, Farmington; Michael P. Jordan, Bountiful; Brent Olson, Clearfield, all of Utah

[73] Assignee: Morton International, Inc., Chicago, Ill.

[21] Appl. No.: 261,519

[22] Filed: Jun. 17, 1994

[51] Int. Cl.[6] .................................................. B60R 21/26
[52] U.S. Cl. .................................................. 280/741; 102/370
[58] Field of Search .......................... 280/741; 102/370

[56] References Cited

U.S. PATENT DOCUMENTS

| | | | |
|---|---|---|---|
| 4,203,787 | 5/1980 | Schneiter | 102/39 |
| 4,369,079 | 1/1983 | Shaw | 149/2 |
| 4,547,342 | 10/1985 | Adams et al. | 422/166 |
| 4,561,675 | 12/1985 | Adams et al. | 280/734 |
| 4,578,247 | 3/1986 | Bolieau | 422/165 |
| 4,943,086 | 7/1990 | Cunningham | 280/741 |
| 5,104,466 | 4/1992 | Allard et al. | 280/741 |
| 5,189,255 | 2/1993 | Fukabori et al. | 280/741 |
| 5,273,722 | 12/1993 | Högenauer et al. | 280/741 |

*Primary Examiner*—Kenneth R. Rice
*Attorney, Agent, or Firm*—Charles N. Lovell; Gerald K. White

[57] ABSTRACT

This invention relates to an inflator housing construction for an air bag inflation system. The inflator housing construction includes first and second aluminum structural components, the diffuser and base. The diffuser and base components are made from different aluminum alloys and are inertia welded to provide an improved hermetic inflator construction.

5 Claims, 2 Drawing Sheets

INERTIA WELDED INFLATOR

BACKGROUND OF THE INVENTION

1. Field of the Invention

This invention relates to gas generators or inflators that utilize the combustion of a solid fuel gas generant composition for the generation of a gas for rapid inflating vehicle passive restraint inflatable crash protection bags, and more particularly, to an improved housing construction for such inflators.

2. Description of the Prior Art

Inflators for the inflation of inflatable crash protection or "air bag" restraint systems must be constructed to withstand the mechanical and thermal stresses generated by such systems. Recent emphasis on weight reduction in automobiles has created the need for a lighter weight "air bag" inflation system. Such lighter weight systems employ aluminum rather than steel in constructing the housing and other structural components. A form of light weight inflator that utilizes aluminum for the housing structure is disclosed in U.S. Pat. No. 4,547,342 granted to Gary V. Adams, Wilbur J. Ahlf, Donald J. Cunningham and David P. Dahle and assigned to the assignee of the present invention. Similar aluminum housings are disclosed in U.S. Pat. No. 4,561,675 granted to Gary V. Adams, Wilbur J. Ahlf, George F. Kirchoff and Rholand E. Lange and U.S. Pat. No. 4,578,247 granted to Christopher W. Bolieau both of which are assigned to the assignee of the present invention.

The housing constructions of such prior art inflators include first and second aluminum structural components, the diffuser and the base. The diffuser and base are welded together in a single inertia welding operation to form igniter, combustion and filtering chambers, the assembly being welded in a wholly loaded condition.

Some of the internal components of the inflator are susceptible to the moisture in the air. Thus a problem is encountered when the welds used to secure the diffuser and base components together are not airtight, i.e. hermetic. Each inflator is tested to insure that the weld is airtight. This is done by placing Helium in the diffuser before it is welded to the base, and then using a Helium detector to determine if any Helium is escaping through the weld. If the leak rate of the Helium is below a predetermined value, the inflator passes the leak check portion of its inspection. The inflator housing is also tested to determine if it exhibits the necessary strength properties. Since this involves destructive testing, each inflator cannot realistically be tested. Therefore, a history must be established which, through statistical means, gives confidence that the untested parts will exhibit sound welds.

SUMMARY OF THE INVENTION

An object of the invention is to provide an improvement in the housing construction of an inflator of the inertia welded type such as described in U.S. Pat. Nos. 4,547,342 and 4,578,247 an improvement which results in the obtention of an inflator having a better leak rate performance.

Another object of the invention is to provide such improved inflator housing construction, which meets the high reliability standards of a safety device and at the same time can be manufactured in high production rates at low cost.

Another object of the invention is to provide an improved inertia welded inflator housing construction having diffuser and base components made from different alloy materials.

Another object of the invention is to provide an improved inertia welded light-weight aluminum inflator housing construction wherein the higher stressed housing component is made of a higher strength material than the lower stressed component. The strength of the inflator is an important design feature. Since stresses in the hoop direction of a pressure vessel are twice the stresses in the longitudinal direction, it is desirable to have the highest strength material where the highest stresses are.

A further object of the invention is to provide an inertia welding process for providing an inflator housing having an improved hermetic seal, i.e. improved leak rate performance.

A specific object of the invention is to provide an inertia welded inflator housing construction comprising 7129 aluminum diffuser and 6061 aluminum base components.

In accomplishing these and other objectives of the present invention, there is provided for the gas generator a housing construction comprising first and second structural components or shells, specifically a first shell or diffuser shell and a second or base shell. Both shells may be forged, heat treated and then final machined. The diffuser structural component forms a first subassembly and includes multiple concentric cylinders that extend from a first common wall means to form structural walls of the generator and provide exit openings or port holes for the passage of inflation gas into the air bag structure that is to be inflated. The base structural component forms a second subassembly and includes multiple concentric cylinders that extend from a second common wall means to form structural walls of the inflator and to provide complimentary mating surfaces for the concentric cylinders of the diffuser to form therebetween at least two concentric cylinders. In accordance with the invention, at least two concentric cylinders of the diffuser shell are simultaneously joined to the concentric mating surfaces of the base shell by a single inertia welding operation.

BRIEF DESCRIPTION OF THE DRAWING

Having summarized the invention, a detailed description of the invention follows with reference being made to the accompanying drawings which form part of the specification, of which.

DESCRIPTION OF THE PREFERRED EMBODIMENT

Figure 1:
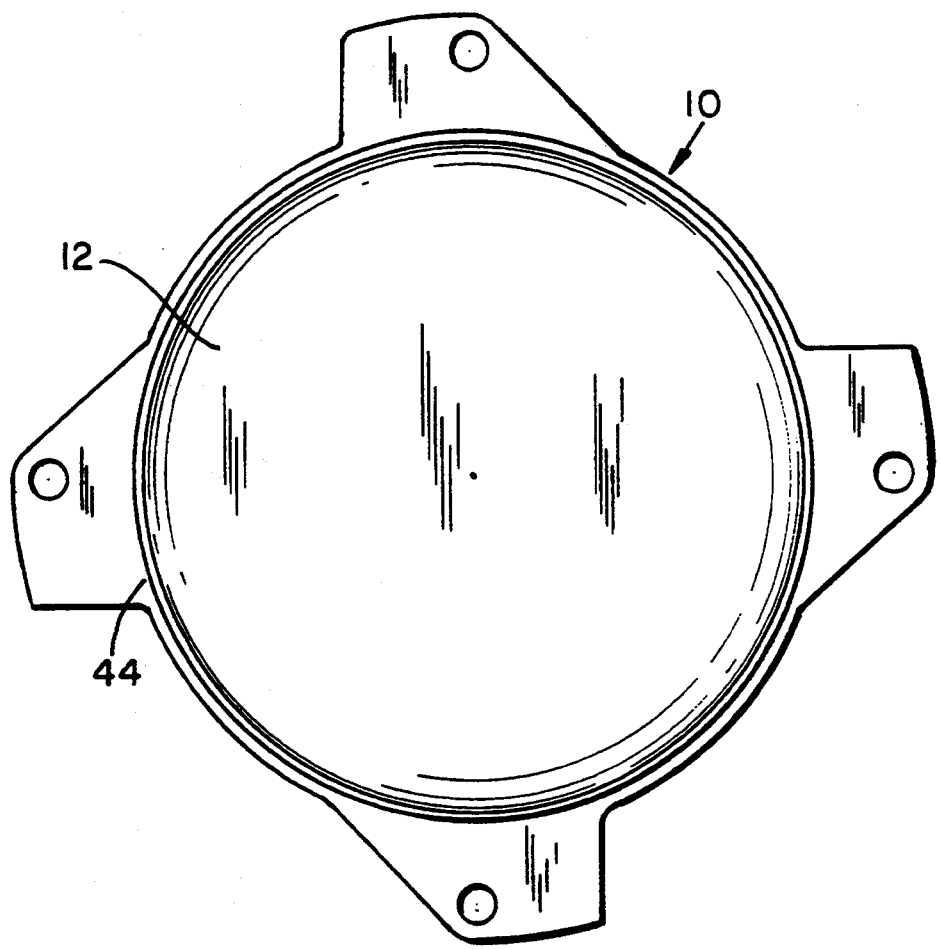
FIG. 1 is a top plan view of the improved gas generator embodying the invention.
Figure 2:
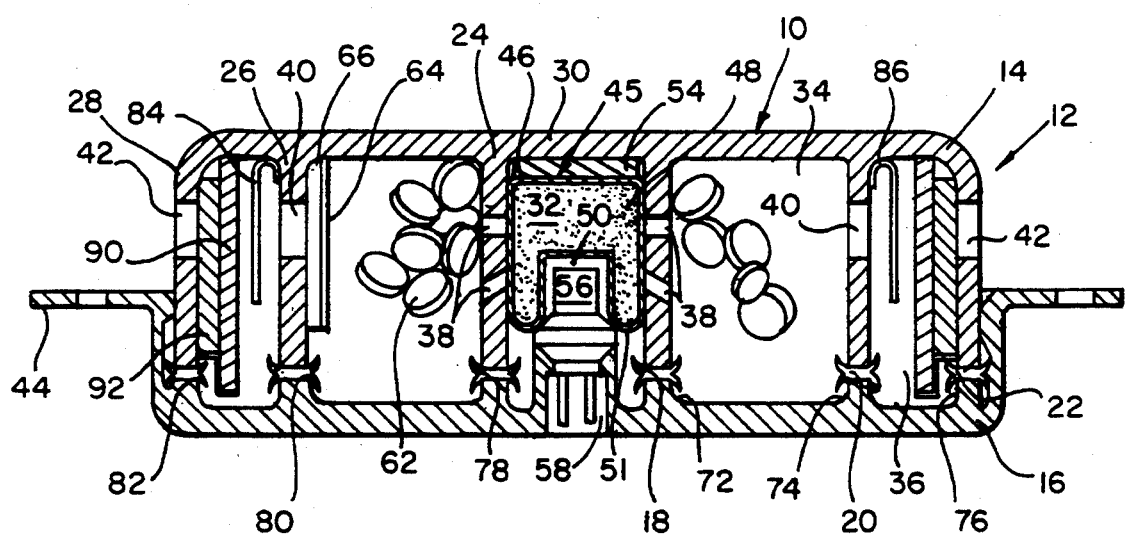
FIG. 2 is a cross-sectional view of the gas generator of FIG. 1 taken along lines 2—2 of FIG.1.

The gas generator or inflator assembly according to the present invention has a generally cylindrical external outline, as shown in FIGS. 1 and 2 and includes a housing construction 12 comprising two structural components. The two structural components, as shown in FIG. 2 comprise an upper shell or diffuser 14 and a lower shell or base 16 which are joined by three concentric inertia welds shown at 18, 20 and 22 to form the housing construction 12 of the inflator assembly 10. A feature of the invention is that the three inertia welds are performed simultaneously in a single welding operation. While the description of the preferred embodiment is directed to an inflator construction comprising three concentric cylinders, the invention is equally directed to an inflator construction comprising multiple concentric cylinders, i.e. two or more.

The diffuser 14 may be formed by forging three concentric cylinders 24, 26 and 28, each of which cylinders extend downwardly from a common flat upper wall of the diffuser 14 to form a separate weld interface with the base 16. The intermediate cylinder 26, in cooperation with inner cylinder 24, wall 30 and base 16 forms an inner chamber having the shape of a toroid, specifically a combustion chamber 34. The outer cylinder 28, in cooperation with the intermediate cylinder 26, wall 30, and base 16, forms an outer chamber 36 that also has the shape of a toroid. Cylinders 24, 26 and 28 each include a plurality of uniformly spaced exhaust openings or ports 38, 40 and 42 respectively, through which the generated or inflation gas flows into a protective air bag (not shown) to be filled. The base 16 includes an interface attachment flange 44 which is used to attach the inflator assembly 10 to a vehicle the occupants of which are to be protected.

Positioned within the igniter chamber 32 is an igniter charge assembly 45 comprising a rupturable closed aluminum container 46 containing igniting material 48. Container 46 may be hermetically sealed against moisture, has a recess or cavity 50 formed in the bottom 51 thereof, and is retained in chamber 32 by a retaining ring 52. Retaining ring 52 has a shape conforming to the bottom 51 of container 46 including recess 50 and may be inserted in the end of chamber 32 in press fit relation therewith. At the top end thereof, container 46 is held in spaced relations with the inner surface of wall 30 by cushion/spacer material 54 which desirably may comprise a cerafiber material.

Although various pyrotechnic materials may be employed for igniter material 48, a preferred material is a granular mixture of 25% by weight of boron and 75% of potassium nitrate. This mixture has been found to burn with a very hot flame that is suitable for igniting the solid fuel gas generant material employed in the inflator assembly 10, as described hereinafter.

Extending into recess 50 of container 46 is an initiator 56. Initiator 56, as shown, has a conically shaped lower portion and is mounted in a hole 58 having a mating conically shaped upper portion, the hole 58 being provided at a central location in base 16. Initiator 56 is retained in hole 58 by a crimp 60 that is formed in base 16 at the upper end of hole 58 and which overlaps and engages the conically shaped upper portion of initiator 56. Initiator 56 may be a conventional electric squib having a pair of energizing electrical terminals (not shown) that are adapted for plug-in connection to external crash sensor means (not shown).

Contained within the toroidal combustion chamber 34 are uniformly distributed pellets 62 of a gas generant composition which may be any one of a number of compositions meeting the requirements of burning rate, nontoxicity, and flame temperature. One composition that may be utilized is that described in U.S. Pat. No. 4,203,787 granted to Fred E. Schneiter and George F. Kirchoff. Another composition that may advantageously be utilized is that described in U.S. Pat. No. 4,369,079 granted to Graham C. Shaw, which patent is assigned to the assignee of the present invention.

Pellets 62 are surrounded by an annular inner screen pack or combustion chamber filter 64. Inner screen pack 64, as shown in FIG. 2, may desirably include a layer 66 of coarse screen adjacent to the inner surface of concentric cylinder 26.

Figure 3:
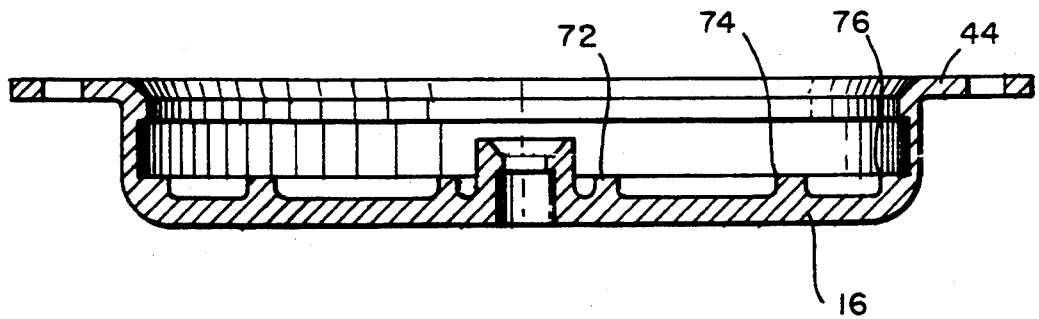
FIG. 3 is a sectional view showing the base configuration for the inflator of FIG.1.

As shown in FIG. 2, the concentric interface regions of base 16 that mate with the three concentric cylinders 24, 26 and 28 comprise short concentric-like stubs 72, 74 and 76, respectively. Stubs 72, 74 and 76 are illustrated in FIG. 3 as the mating interfaces of base 16 for the concentric cylinders 24, 26 and 28.

It is noted that during the formation of the inertia welds 18, 20 and 22, flashing indicated respectively at 78, 80 and 82 is formed around the ends of the concentric cylinders 24, 26 and 28 in each of the invention embodiments.

In the outer toroidal chamber 36, as seen in FIG. 2, an aluminum deflector ring 84 is provided. Deflector ring 84 is formed with an inwardly directed curved flange 86 at its upper end. Also included in the toroidal chamber 36 is an outer screen pack or filter 90. Screen pack 90 may desirably include a coarse layer 92 adjacent the inner surface of cylinder 28.

In accordance with the invention, the housing construction 12 provides a structure for containing the high pressure inflation gases which are produced by combustion of the gas generant pellets 62. Functioning of the inflator assembly 10 begins with an electrical signal from a crash sensor (not shown) to the initiator 56. The initiator fires into and pierces the closed aluminum container 46 that holds the igniter material 48. The igniter material 48 burns and bursts through the walls of the container 46 and flows through the exit openings 38 in the inner cylinder 24 and into the toroidal combustion chamber 34. The hot igniter gases ignite the gas generant pellets 62 which releases the nitrogen inflator gases. These gases flow through the inner screen filter pack 64 and radially outward through the combustion chamber exit openings 40. The screen filter pack 64 serves to cool the inflator gases and to remove particulate residue therefrom. As the gases exit the combustion chamber openings 40, they are turned downward, as seen in FIG. 2, by deflector ring 84 where they strike flashing 80 from the intermediate cylinder inertia weld 20. The flashing 80 serves to interrupt the gas flow which helps to further remove particulate matter from the exhaust gases. The inflation gases then flow radially outward through openings 88 in the deflector ring 84 and up into the annular space between deflector ring 84 and up into screen pack 90, through the latter, and finally radially outward through the exit openings or port holes 42. The outer screen pack 90 serves to further cool the exhaust gases and remove particulate matter.

Further in accordance with the invention, the inflator is welded in the wholly loaded condition. During the inertia welding operation, the assembly of the loaded diffuser 14 containing the igniter material 48, gas generant pellets 62, inner screen pack 64, deflector ring 84, and outer screen pack 90 is held stationary in the inertia welding machine.

In the inertia welding process, the base 16 is connected to a freely rotating mass, then the diffuser is pressed against it with high axial force. The base is driven by a power driven clutch means (not shown) to a speed typically of about 3000 r.p.m. Upon the attainment of such speed the clutch is actuated to disconnect the power source and the freely rotating base is brought into contact with the diffuser so that the concentric stubs 72, 74 and 76 contact the lower ends of a respectively associated one of the three concentric cylinders 24, 26 and 28 of the diffuser 14. The energy from the rotating mass is converted to frictional heat. When the temperature of the parts reaches a certain point, the parts weld together. The welding process takes only a few hundredths of a second. Pressure is maintained for a short period, for example a second or two, to allow the welds 18, 20 and 22 to solidify.

The recommended welding parameters for current welders are:

RPM>2000 to <3500 with a target of 2650 PSI 2600
UPSET 0.105 target, with a range of 0.85 to 0.120. RPM should be varied to meet this upset requirement.

During the welding process, flashing 78, 80 and 82 is created at the interface between the respective cylinders 24, 26 and 28 and the base 16. The weld flashing acts to reduce the particulate levels in the effluent gases.

It was discovered that using different materials for constructing the diffuser and base structural components in an inertia welded inflator provided welds that exhibit an improved hermetic seal, i.e. an improved leak resistance, and which have a more even flow of material on both sides of the weld. That is, it was discovered that using different alloy materials for the diffuser and base components increased weld upset and eliminated weld leakers while maintaining good weld strength. Using different alloys includes using alloy materials that have been subjected to different heat treatments and/or alloy materials that have different alloy constituents or have different percentages of the same constituents in a given numerical range. Examples of alloy materials that have been found to be useful in making lightweight inflators are the 6000 and 7000 series aluminum alloys.

A particular good combination of different alloy materials for making the housing was found to reside in using 7129 aluminum alloy for the diffuser and 6061 aluminum alloy for the base. The diffuser material used was a modified 7129 aluminum with the following minimum properties:

Ultimate Tensile Strength—60 ksi
Yield Strength—53 ksi
Elongation—12%
Heat treatment—T6

The base used was made of a 6061 aluminum with the following minimum properties:

Ultimate Tensile Strength—50 ksi
Yield Strength—42 ksi
Elongation—15%
Heat treatment—T6

A T6 temper designation applies to products that have been solution heat-treated and then artificially aged.
The nominal composition of 6061 aluminum alloy is:
0.4–0.8% Si
0.15–0.4% Cu
0.8–1.2% Mg
0.04–0.35% Cr
Balance Al+impurities The nominal composition of 7129 aluminum alloy is:
0.5–0.90% Cu
1.3–2.0% Mg
4.2–5.2% Zn
Balance Al+impurities with the provision that Ti or Zr cannot exceed 0.25% individually or combined.

Testing of the inflator units comprising 6061 base material welded to a 7129 diffuser resulted in 100% of the units passing Helium leak checking. When these inflator units were subjected to hydro burst testing, the strength of the inflators were determined to be acceptable.

By way of further illustration and not limitation it is noted that other combinations of diffuser and base alloy compositions are indicated below:

| DIFFUSER | BASE |
| --- | --- |
| 6070*, 7129, 7425 or different 6061 | 6061 |
| 6061, 7129, 7425 or different 6070 | 6070 |
| 6061, 6070, 7425 or different 7129 | 7129 |
| 6061, 6070, 7129 or different 7425 | 7425 |

*Aluminum Assoc. Designation

Thus there has been provided in accordance with the invention, an improved inflator housing construction which employs different alloy materials for the diffuser and base components and which meets the high reliability standards required of a safety device and at the same time can be manufactured in high production rates to effect a low cost.

With this description of the invention in detail those skilled in the art will appreciate that modifications may be made to the invention without departing from its spirit. Therefore, it is not intended that the scope of the invention be limited to the specific embodiment illustrated and described. Rather, it is intended that the scope of the invention be determined by the following claims and their equivalent.

What is claimed is:

1. An inflator housing construction for the generation of gas to inflate vehicle inflatable crash protection bags comprising:
   diffuser and base structural components made from two different aluminum alloy materials,
   said diffuser structural component having multiple concentric cylinders which extend from a common wall means and define multiple concentric chambers,
   said base structural component having an attachment flange and providing concentric mating surfaces for the concentric cylinders of said diffuser structural component,
   the concentric cylinders of said diffuser structural component being welded to the concentric mating surfaces of said base structural component.

2. An inflator as defined in claim 1 wherein the higher stressed component of said housing is formed of a higher strength aluminum alloy than the alloy material of the lower stressed component.

3. An inflator as defined in claim 1 wherein the diffuser is made of 7129 aluminum.

4. An inflator as defined in claim 3 wherein the base is made of 6061 aluminum.

5. An inflator as defined in claim 1 wherein the diffuser and base components are joined by inertia welds.

* * * * *

UNITED STATES PATENT AND TRADEMARK OFFICE
CERTIFICATE OF CORRECTION

PATENT NO. : 5,419,578

DATED : May 30, 1995

INVENTOR(S) : Kirk Storey, Michael P. Jordan, and Brent Olsen

It is certified that error appears in the above-indentified patent and that said Letters Patent is hereby corrected as shown below:

Column 6, beginning at line 13, in table "7425" should read ---7475---, each occurence.

Signed and Sealed this

Tenth Day of October, 1995

Attest:

BRUCE LEHMAN

Attesting Officer

Commissioner of Patents and Trademarks